(12) United States Patent
Hayford

(10) Patent No.: US 6,488,131 B2
(45) Date of Patent: Dec. 3, 2002

(54) DISC BRAKE FRICTION LINING ASSEMBLY

(75) Inventor: Roy Hayford, Redford, MI (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 0 days.

(21) Appl. No.: 09/767,972

(22) Filed: Jan. 23, 2001

(65) Prior Publication Data

US 2002/0096403 A1 Jul. 25, 2002

(51) Int. Cl.[7] ................................................ F16D 65/38
(52) U.S. Cl. ................. 188/73.39; 188/73.1; 188/250 B
(58) Field of Search .......................... 188/250 R, 73.39, 188/73.1, 250 B, 258; 428/450; 164/98

(56) References Cited

U.S. PATENT DOCUMENTS

| 3,964,850 | A | * | 6/1976 | Hahm |
| 4,230,207 | A | * | 10/1980 | Stahl |
| 4,552,252 | A | * | 11/1985 | Stahl |
| 4,569,424 | A | | 2/1986 | Taylor, Jr. |
| 4,691,810 | A | * | 9/1987 | Matsuzaki |
| 4,799,579 | A | | 1/1989 | Myers et al. |
| 5,480,008 | A | | 1/1996 | Hummel et al. |
| 5,494,140 | A | | 2/1996 | Weiler et al. |
| 5,890,566 | A | * | 4/1999 | Yoshida |
| 5,984,055 | A | | 11/1999 | Strasser et al. |

* cited by examiner

Primary Examiner—Christopher P. Schwartz
Assistant Examiner—C. T. Bartz
(74) Attorney, Agent, or Firm—Carlson Gaskey & Olds, P.C.

(57) ABSTRACT

A universal friction lining support is affixed on or just under the surface of a friction lining to resist wear and vibrations caused by the road, eliminating the need for a backing plate. The support is configured to fit in the corners of friction linings of various lining assembly sizes. Extensions on the exterior edge of the support locate the friction lining relative to the caliper housing as the piston is engaged. Various attachment features, such as holes or protrusions, can be also added to the support to secure the support to the friction lining.

15 Claims, 3 Drawing Sheets

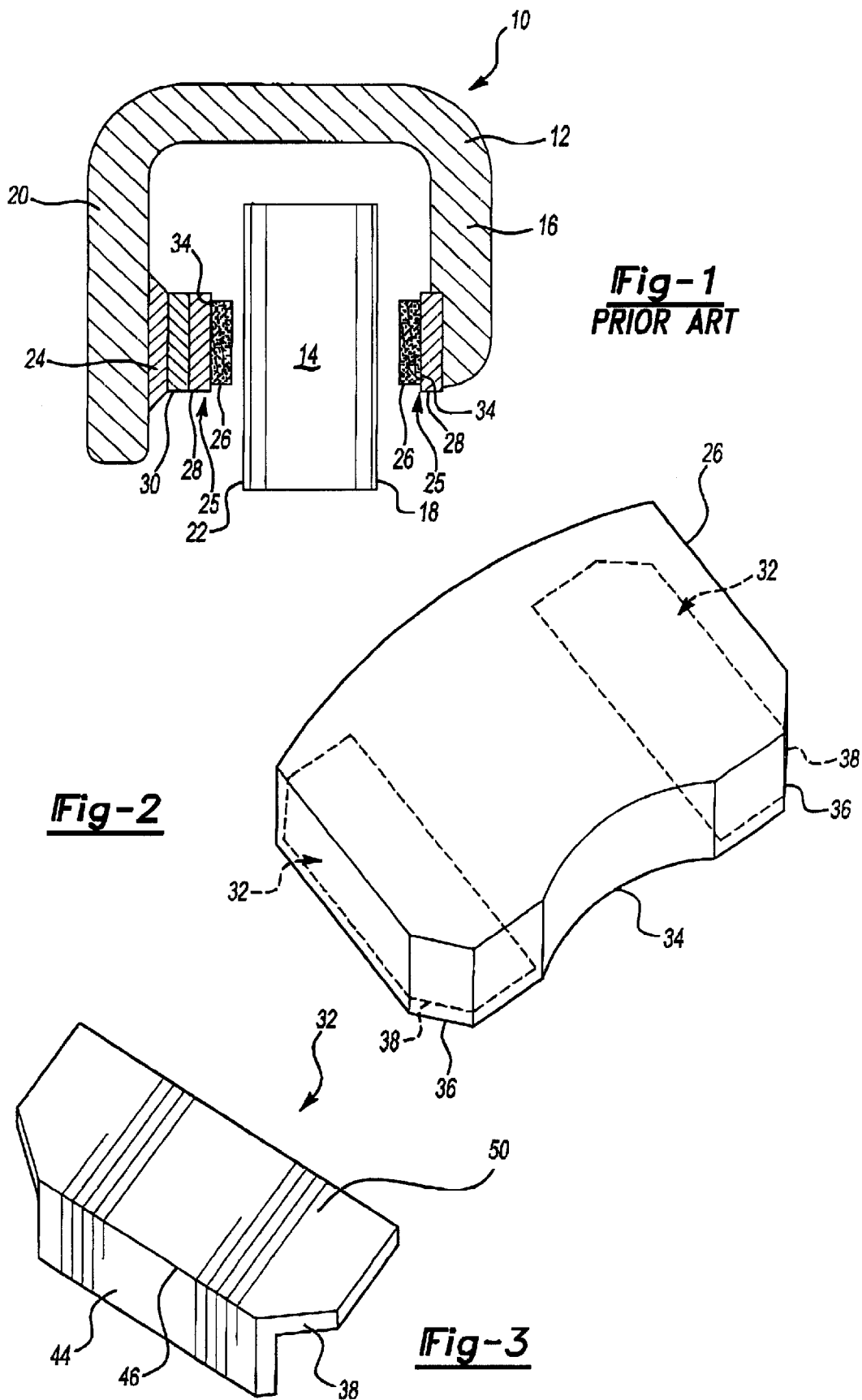

DISC BRAKE FRICTION LINING ASSEMBLY

BACKGROUND OF THE INVENTION

The present invention relates generally to brake pads for use with vehicle brake calipers, and more specifically, the invention relates to brake pad backing plates.

Disc braking systems use brake pads which have a custom manufactured metal backing plate attached to a friction lining. The backing plate creates a surface which helps the friction lining withstand the reaction force or vibrational impact caused by the road as the brake pads engage the rotor. Friction linings are commonly attached to the surface of a backing plate by rivets. The rivets are received within numerous recesses in the braking surface of the lining. Additionally, locators on the backing plate locate the brake pad relative to the caliper to prevent rotation of the brake pad when the piston is engaged.

Prior art backing plates have several drawbacks. The backing plates are usually manufactured from plates of steel, which requires expensive tooling. Backing plates are specifically manufactured for each brake design, requiring a different backing plate and tooling for different linings.

The thickness of the friction lining decreases over the life of the brake pads due to wear. As a result, the rivets gradually approach the braking surface. A common problem with utilizing rivets is the incidents of the rivets scoring the brake rotors when the friction linings wear down. Additionally, the rivets significantly reduce the surface area of the friction lining which contacts the brake rotor.

Hence, there is a need in the art for a brake pad which does not require custom backing plates that must be riveted to the friction lining.

SUMMARY OF THE INVENTION

An inventive embodiment includes a metal friction lining support affixed on or just under the surface of a friction lining. The support is symmetrical such that it can be affixed to either of the corners of the friction lining.

In a first embodiment, the friction lining support is L-shaped and includes a perpendicular extension which locates the friction lining relative to the caliper housing. The support can be affixed to any friction lining, regardless of size, since the support is universal and configured to fit in the corner of a friction lining of any size. In another embodiment, the support is planar and does not include perpendicular locators.

The friction lining support can also includes holes or protrusions located on the surface of the support. The holes or protrusion assist in affixing the support to the friction lining by molding the support in the friction lining and provide more useable lining material compared to rivet fasteners.

Accordingly, the present invention provides a friction lining support composed of metal which is affixed to or just under the surface of a friction lining to create a surface which withstands the reaction force or vibration impact caused by road input.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows:

FIG. 1 illustrates a cross-sectional view of a prior art caliper housing disc brake assembly.

FIG. 2 is a schematic view of a friction lining with an affixed pair of friction lining supports.

FIG. 3 illustrates a schematic view of a friction lining support with an extension.

DETAILED DESCRIPTION OF THE PREFERRED EMBODIMENT

Figure 4:
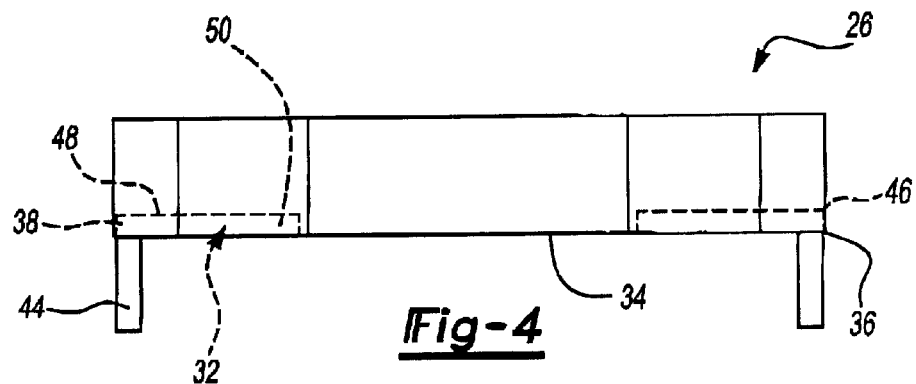
FIG. 4 illustrates a side view of a friction lining with an affixed pair of friction lining supports with extensions.

FIG. 1 illustrates a cross-sectional view of a prior art caliper disc brake assembly 10. The caliper housing disc brake assembly 10 generally includes a caliper housing 12 which bridges a rotor 14. The rotor 14 carries the wheel (not shown) and rotates in combination with it. The caliper housing 12 includes an outboard leg 16 on the outboard side 18 of the rotor 14 and an inboard leg 20 on the inboard side 22 of the rotor 14. The inboard leg 20 further includes a piston 24 which is mounted for movement towards the inboard side 22 of the rotor 14.

Brake pads 25 are arranged on either side of the rotor 14 and engage the rotor 14 when the piston 24 is actuated by the brake pedal (not shown). In prior art caliper disc brake assemblies, the brake pads 25 include a friction lining 26 and a custom metal backing plate 28. The metal backing plate 28 is placed under each friction lining 26 to resist wear and vibrations. The brake pads 25 are positioned on both the piston 24 and the outboard leg 16 in order to engage the rotor 14. If the backing plate 28 were eliminated, the friction linings 26 would not be able to withstand the reaction force or vibration impact due to road input into the brake. On the inboard leg 20 of the caliper housing 12, a load distribution plate 30 is placed under the backing plate 28 to provide additional support for the friction lining 26.

As shown in FIG. 2, a universal support 32 is affixed at adjacent corners 36 of the friction lining 26. The support 32 is molded either on or just under the outer surface 34 of the friction lining 26. The dimensions of the support 32 allow it to be used on different lining assembly sizes because the support 32 is configured to fit in the corner 36 of a friction lining 26 of various sizes.

The support 32 is symmetrical such that is can be affixed to a corner 36 of the friction lining 26. The support 32 is affixed to the friction lining 26 such that the exterior corner 38 of the support 32 is substantially proximate to one of the corners 36 of the friction lining 26. At this location, the support 32 is able to react against the caliper housing 12 due to brake torque and prevent rotation of the friction lining 26.

In the preferred embodiment, as shown in FIGS. 3 and 4, the support 32 is composed of metal and is substantially L-shaped. The support 32 further includes an extension 44 attached perpendicularly to the exterior edge 46 of a lining portion 50 of the support 32, such that the extension 44 projects away from the friction lining 26. As shown, the friction lining 26 surrounds the lining portion 50 of the support 32.

Figure 5:
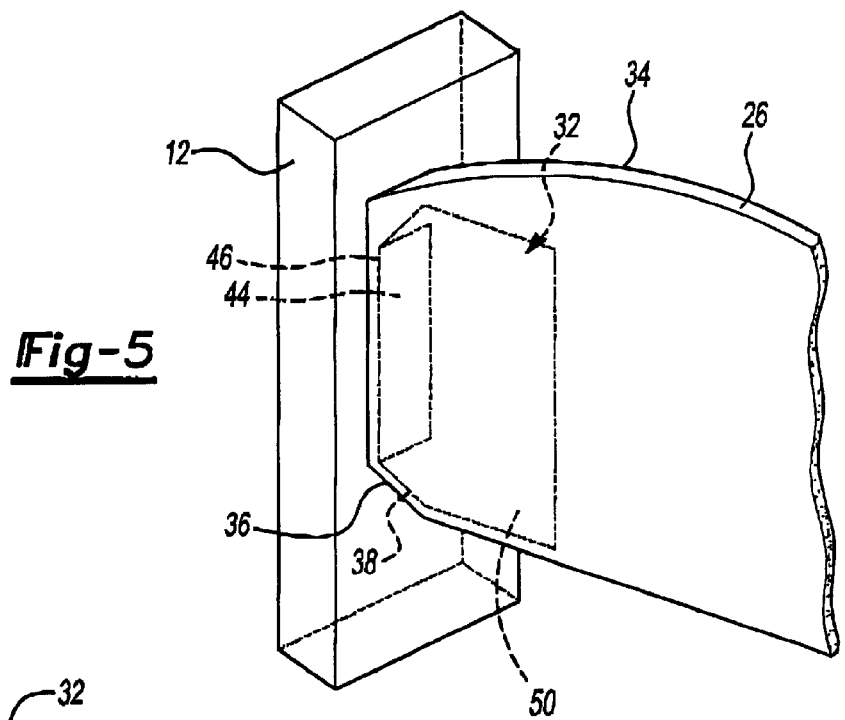
FIG. 5 illustrates a schematic view of a friction lining support with an extension affixed to a brake pad, the extension of the friction lining support locating the brake pad relative to the caliper housing to prevent rotation.

As shown in FIG. 5, the extensions 44 contact the caliper housing 12 in order to locate the friction lining 26 with respect to the caliper housing 12. As the piston 24 is engaged, various forces will cause the friction lining 26 to rotate. The extensions 44 prevent this rotation by contacting the caliper housing 12 as the piston 24 is engaged.

Figure 6:
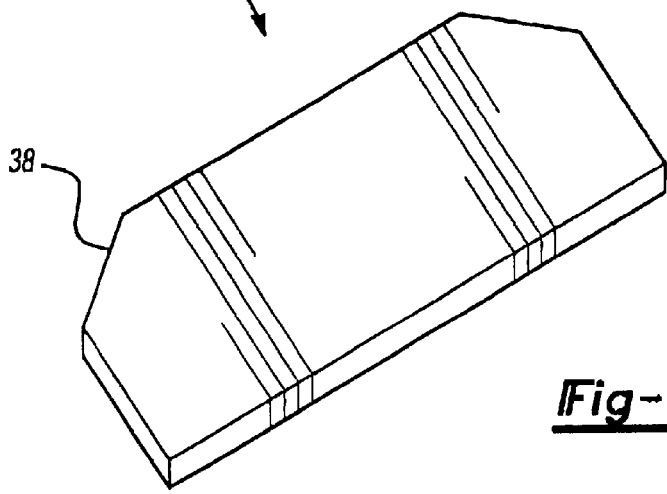
FIG. 6 illustrates a schematic view of a friction lining support.
Figure 7:
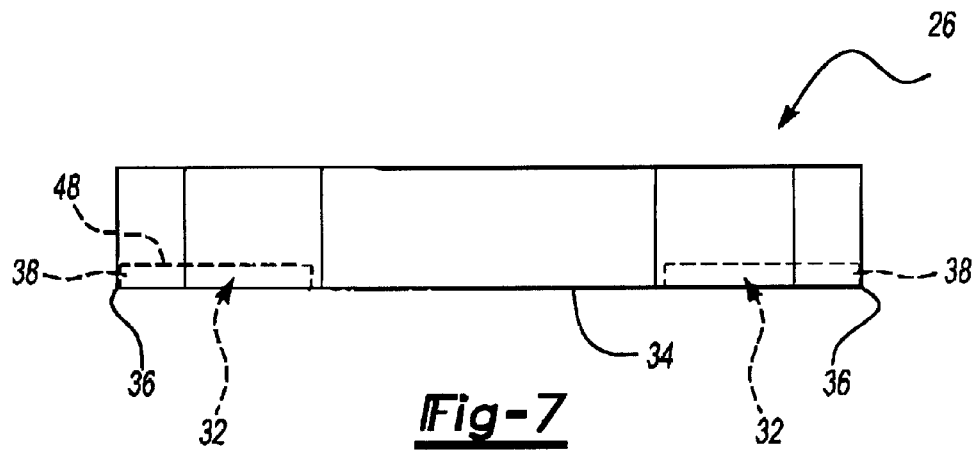
FIG. 7 illustrates a side view of a friction lining with an affixed pair of friction lining supports.

FIGS. 6 and 7 illustrate an alternative embodiment of the present invention. In this embodiment, the support 32 is planar and does not include extensions 44.

Figure 8:
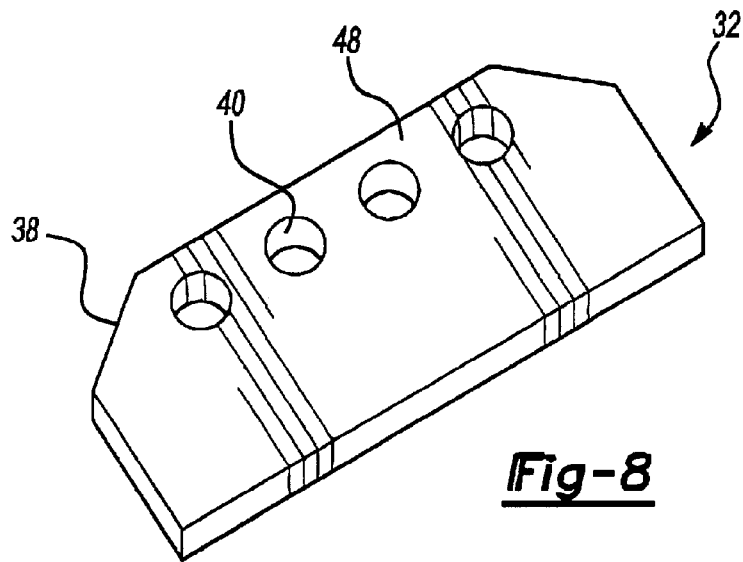
FIG. 8 illustrates a schematic view of a friction lining support with holes.
Figure 9:
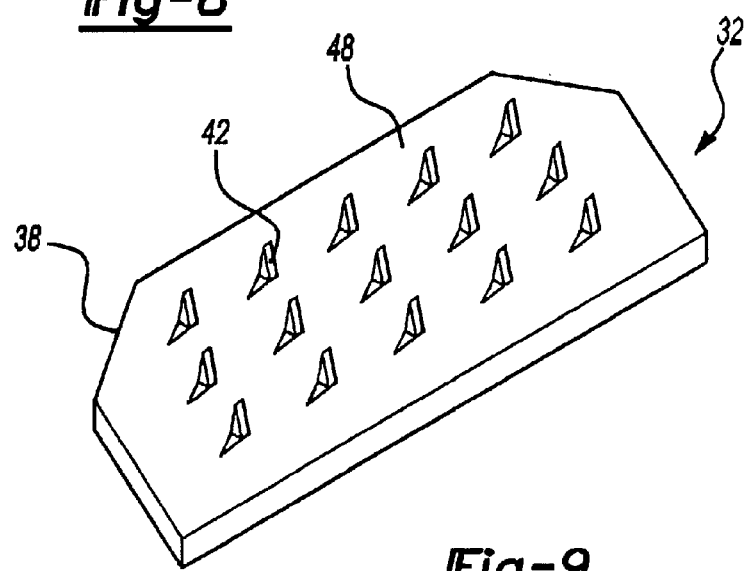
FIG. 9 illustrates a schematic view of a friction lining support with protrusions.

The support 32 does not have to be manufactured of plate stock, so the support 32 can include additional features. As shown in FIGS. 8 and 9, various attachment features, such as holes 40 or protrusions 42 can be added to the surface 48 of the support 32 to assist in molding the friction lining 26 around the support 32.

By using a support 32 to resist wear and vibrations, a prior art backing plate 28 need not be utilized. Since the support 32 is universal and standard in size, it can be used on numerous lining assembly sizes. Prior art braking systems commonly used custom backing plates 28. Backing plates 28 are expensive, very detailed, and must be specifically manufactured for each brake design. The support 32 of the present invention would be made of less expensive plate stock, allowing the addition of other features, such as holes 40 and protrusions 42. Accordingly, the present invention provides a universal support 32 affixed to one of the corners 36 of a friction lining 26 to provide resistance to wear and vibrations caused by the road, eliminating the need of a backing plate 28.

The foregoing description is exemplary rather than defined by the limitations within. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A disc brake pad comprising:

a friction lining having an outer caliper surface; and a pair of spaced apart non-contacting friction lining supports each having a lining portion, each support affixed to said friction lining at said lining portion, and said supports are L-shaped, said supports further comprising an exterior edge and an extension attached perpendicularly to said supports at said exterior edge, said extension locating said disc brake pad relative to a caliper and preventing rotation of said disc brake pad during braking.

2. The assembly as recited in claim 2 wherein said non-contacting friction lining supports are separated by said outer caliper surface of said friction lining.

3. The assembly as recited in claim 2 wherein said friction lining has a pair of corners, said friction lining support each having an exterior corner substantially proximate to one of said corners of said friction lining.

4. The assembly as recited in claim 2 wherein said support is formed of metal.

5. The assembly as recited in claim 2 wherein said lining portion of said support is affixed to said caliper surface of said friction lining.

6. The assembly as recited in claim 2 wherein said lining portion of said support is affixed slightly under said caliper surface of said friction lining.

7. The assembly as recited in claim 2 wherein said friction lining partially surrounds said lining portion of said support.

8. The assembly as recited in claim 2 wherein said lining portion further comprises a plurality of holes with portions of the friction lining disposed therein to attach said support to said friction lining.

9. The assembly as recited in claim 2 wherein said lining portion further comprises a plurality of protrusions to attach said support to said friction lining.

10. A disc brake pad comprising:

a friction lining having an outer caliper surface; and a pair of spaced apart non-contacting friction lining supports each having a lining portion, each support affixed to said friction lining at said lining portion, and said supports are generally planar.

11. The assembly as recited in claim 10 wherein said friction lining has a pair of corners, said friction lining supports each having an exterior corner substantially proximate to one of said corners of said friction lining.

12. A caliper assembly comprising:

a caliper housing having a first leg and a second leg;

a first friction lining attached to said first leg of said caliper housing; and a first pair of spaced apart L-shaped supports affixed to said first friction lining, each support having a perpendicular extension which contacts said caliper housing and locates said first friction lining relative to said caliper housing and prevents rotation of said first friction lining during braking.

13. The assembly as recited in claim 12 wherein said caliper assembly further comprises:

a second friction lining attached to said second leg of said caliper housing; and a second pair of spaced apart L-shaped second supports affixed to said second friction lining, each support having a perpendicular extension which contacts said caliper housing and locates said second friction lining relative to said caliper housing and prevents rotation of said second friction lining during braking.

14. A caliper assembly comprising:

a caliper housing having a first leg and a second leg;

a first friction lining attached to said first leg of said caliper housing; and a first pair of spaced apart generally planar supports affixed to said first friction lining.

15. The assembly as recited in claim 14 wherein said caliper assembly further comprises:

a second friction lining attached to said second leg of said caliper housing; and a second pair of spaced apart generally planar second supports affixed to said second friction lining.

* * * * *